Aug. 28, 1928.
P. H. WENZL
1,682,315
ENGINE CRANK SHAFT AND CONNECTING ROD CONSTRUCTION
Filed March 12, 1927
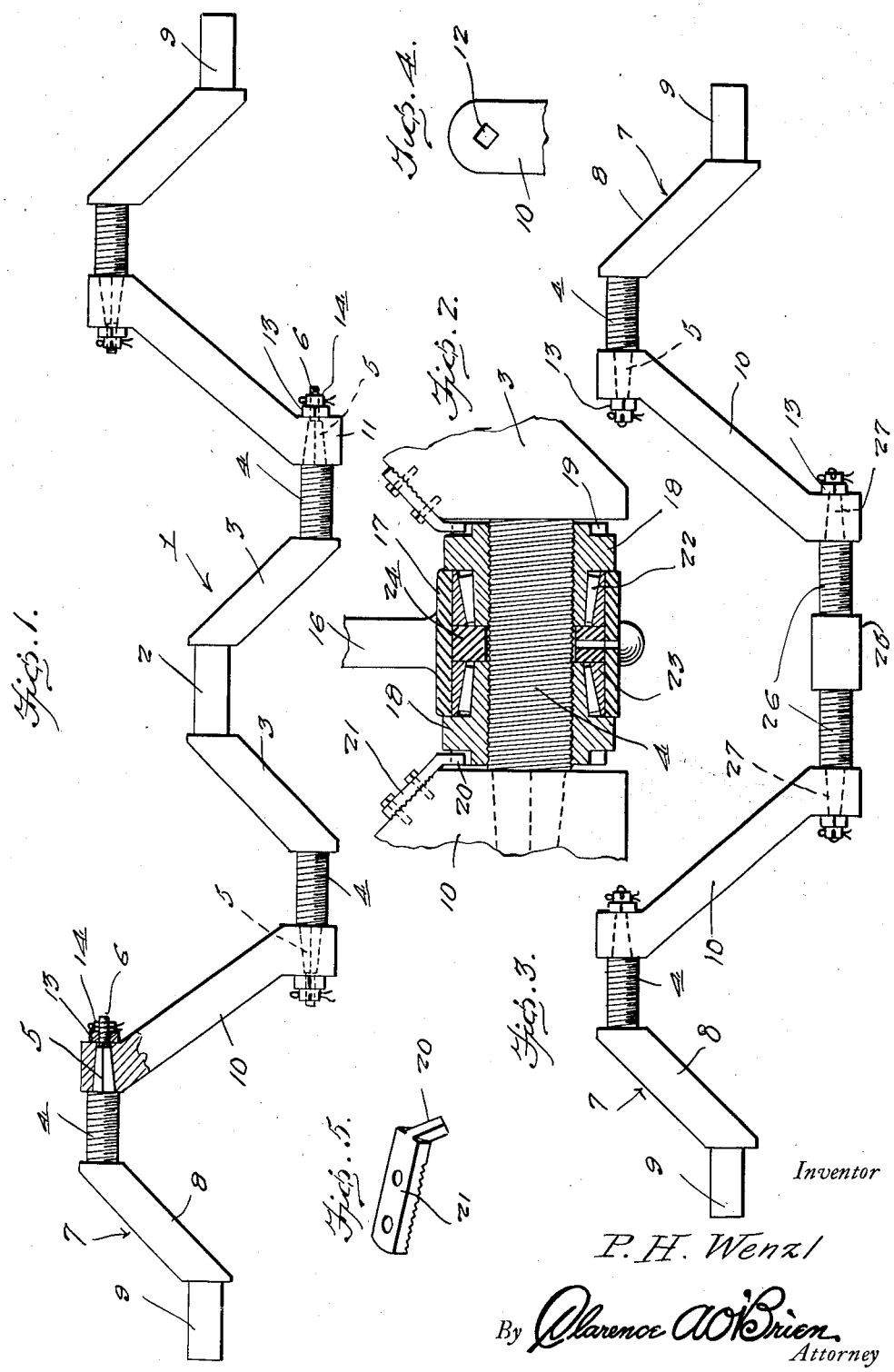
Inventor
P. H. Wenzl
By Clarence A. O'Brien
Attorney Patented Aug. 28, 1928.

1,682,315

UNITED STATES PATENT OFFICE.

PHILIP H. WENZL, OF VALLEY FALLS, KANSAS.

ENGINE CRANK-SHAFT AND CONNECTING-ROD CONSTRUCTION.

Application filed March 12, 1927. Serial No. 174,944.

This invention relates to an improved engine crank shaft of the built-up type, a novel crank pin construction, together with a novel bearing and connecting structure for the piston rod.

What I propose to do is to provide a built-up crank structure which is an improvement upon known patented and marketed structures of the same general class, the object being to provide a crank shaft wherein the same is formed of separable sections including screw-threaded crank pins with which a sectional bearing is associated.

The foregoing sectional structure is produced with a view towards permitting worn and broken crank pins to be readily replaced with new ones, thus eliminating the necessity of discarding the entire crank shaft.

Another object is the provision of a sectional crank shaft structure of this kind wherein the expense of production is materially reduced and wherein the several parts can be manufactured separately and different parts retained at hand for the purpose of substitution, the construction being such that the crank shaft can be repaired by an unskilled hand.

A further feature of the invention is to provide a structure of this kind wherein the stresses and strains are equally distributed in such a manner as to withstand the shocks to which a structure of this kind is subjected, thereby insuring a practical, as well as efficient construction which is highly dependable.

Another and equally important feature is derived from the use of a crank shaft of the sectional type which permits use of a different kind of connecting rod which in the present instance has a one-piece ring-like head which can be slipped over the crank pin when the sections of the crank shaft are dis-assembled, there being a special bearing assembly provided to be interposed between the crank pin and the bearing head on the connecting rod.

Other objects, advantages, and features will become apparent from the following description and drawing.

In the accompanying drawings:—

Figure 1 is a side view of a complete crank shaft constructed in accordance with the invention with portions shown in elevation and section to disclose the construction and arrangement clearly, Figure 2 is an enlarged fragmentary detail sectional view showing the bearing structure in detail, Figure 3 is a side view of a modified embodiment of the invention, Figure 4 is a fragment of one of the separable arms.

Fig. 5 is a perspective view of one of the details.

Attention is first invited to Figure 1 wherein it will be seen that the reference character 1 designates generally the arched stock which includes a central journal 2 and diverging arms 3 which terminate in right angularly disposed screw-threaded crank pins 4. Each crank pin terminates in a tapered extremity 5 of polygonal cross section, this extremity carrying a reduced screw-threaded shank 6. Each end section designated by the reference character 7 includes on one end a duplicate crank pin 4 having the features already described. This is carried by the intermediate portion 8 on the opposite end of which is an end bearing journal 9. The end sections 7 are connected to the stock through the medium of a connecting member 10 having offset ends 11, each of which is provided with a hole into which the polygonal extremity 5 is fitted. Incidentally, this hole is of a length slightly greater than the length of the portion 5. When the parts are assembled, the screw-threaded shank extends beyond the offset ends and a washer 13 is placed thereon and held in place by a retaining nut 14. The nut is maintained against accidental displacement by a cotter key as shown. Obviously, the parts are so assembled as to dispose the journals 2 and 9 in longitudinal alinement.

In Figure 2 I show a portion of a connecting rod represented at 16, this having an improved one-piece bearing head of ring-like form 17. The bearing head surrounds a special bearing assembly which includes a pair of duplicate bearing sleeves threaded upon the crank end as shown. Each bearing sleeve has an outstanding flange 18 provided with keeper seats 19 into which the offset finger 20 of the retainer 21 extends. The retainer is bolted to the parts 3 and 10 respectively as represented. This prevents accidental turning of the sleeve. The inner end portions of the sleeves are moved to provide an annular race for the bearing cones 22. There are two sets of the bearing cones which cooperate with the race rings 23 fitted into the head 17 and maintained in spaced relation by a casing ring 24.

As before indicated it is of particular importance to note that the head on the connecting rod is of one piece or ring-like design. This permits it to be slipped over the screw-threaded pin after the first bearing sleeve has been placed in position. It also allows the novel assembly of the ball-bearing races, together with convenient application of the remaining sleeves. Obviously, the structure is advantageous in that it reduces wear and tear and decidedly prolongs the life of the parts, as well facilitating the driving action from the crank shaft.

In the form of the invention represented in Figure 3 a somewhat similar construction is provided, the end section 7 being the same as described, as are the connecting members 10. The connecting members in this instance instead of being connected to a stock of the character represented in Figure 1, are connected with a double crank pin 25 including screw-threaded portions 26 having reduced tapered polygonal extensions 27 and other details already described.

It is believed that by considering the details of description in connection with the drawings, a clear understanding of the construction and arrangement as well as the method of assembling and replacement and operation will be clear. In view of this, a more lengthy description is thought unnecessary.

While the preferred embodiment of the invention has been disclosed in detail, it is to be understood that minor changes coming within the field of invention claimed may be resorted to if desired.

I claim:—

1. In a crank shaft structure of the class described, an end section comprising an intermediate portion, an angularly disposed journal at one end thereof, a screw-threaded pin at the opposite end and also disposed at an angle to said intermediate portion, said pin having its outer end formed in a reduced and tapered extension of polygonal cross-section carrying a further reduced screw-threaded shank, and a connecting member having an offset end provided with a hole through which said extension extends, said hole being of a shape corresponding to said extension, said shank extending beyond one end of said hole, and a restraining nut carried by said shank.

2. In a crank shaft structure of the class described, a shaft section embodying an angularly disposed screw-threaded pin, a pair of bearing sleeves threaded on said pin, and another crank shaft section provided with a tapered hole of polygonal cross section, the adjacent end of said pin being provided with a reduced extension of a shape corresponding to said hole, said extension fitting snugly in said hole and carrying a reduced screw-threaded shank extending beyond the said hole, and a retaining nut connected with said shank.

3. In a crank shaft and connecting rod of the structure of the class described, in combination, a crank shaft section provided with an angularly disposed externally screw-threaded cylindrical pin terminating in a reduced tapered polygonal extension having its extremity screw-threaded forming a nut-receiving shank, a bearing sleeve threaded on said connecting pin and bearing against the body portion of the crank shaft section at the inner end of the pin, a one-piece ring-like member slipped over said pin and partly surrounding said sleeve, a spacer located at the center of said member and surrounding said pin, anti-friction bearings arranged within said member and surrounding said sleeve at a point between the sleeve and said spacer, a second sleeve fitted on said pin and having a portion extending into said member, and additional bearings associated with the second sleeve and head and disposed on the opposite side of the spacer, and retaining means for said second-named sleeve.

In testimony whereof I affix my signature.

PHILIP H. WENZL.